June 13, 1933. B. H. URSCHEL 1,913,464

PROCESS OF FORMING AN AXLE

Filed Aug. 26, 1930

Inventor
Bertis H. Urschel
By Faust F. Crampton
Attorney

Patented June 13, 1933

1,913,464

UNITED STATES PATENT OFFICE

BERTIS H. URSCHEL, OF BOWLING GREEN, OHIO, ASSIGNOR TO URSCHEL ENGINEERING COMPANY, OF TOLEDO, OHIO, A CORPORATION OF OHIO

PROCESS OF FORMING AN AXLE

Application filed August 26, 1930. Serial No. 477,814.

My invention has for its object to form steel mechanical elements usable for different purposes and which is so constructed as to provide a machinable bearing therein, and yet may be hardened by tempering to greatly increase its strength while maintaining the bearing part relatively soft and machinable. The invention is particularly advantageous when applied to relatively large constructions wherein bearings must necessarily be finished by grinding operations if the bearing is to be tempered to the hardness that is required for the body of the mechanical element.

The invention may be embodied in structures of different forms and which may be used for a great variety of purposes. Thus the invention may be embodied in axles of vehicles, automobile springs, radius rods, the driver arms of locomotives, etc. To illustrate a practical application of the invention, I have selected an automobile axle as an example of the various structures and details thereof, that contain the invention, and wherein the method, using my invention, is employed in its formation, and shall describe the particular article referred to, together with the method, it being understood that variations in the structure may be made without departing from the spirit of the invention. The particular structure selected is shown in the accompanying drawing.

Figure 1:
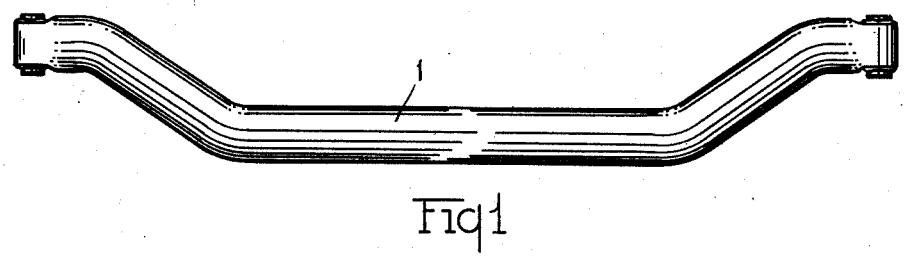
Figure 2:
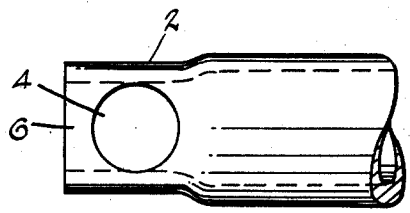
Figure 3:
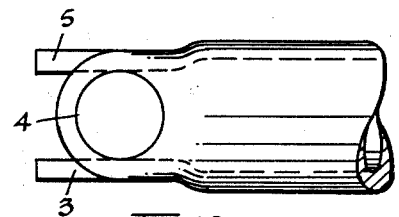
Figure 5:
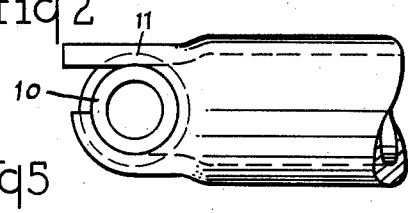
Figure 4:
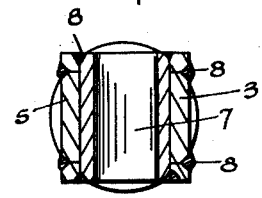
Figure 6:
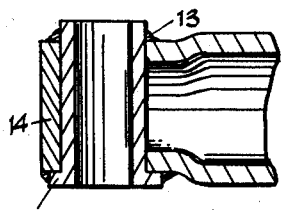
Figure 7:
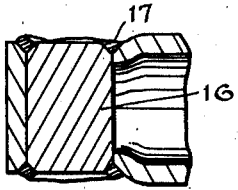
Figure 8:
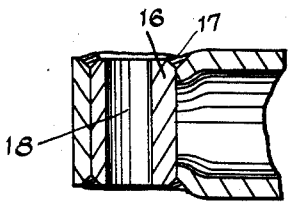

Fig. 1 of the drawing illustrates a side view of the main axle of an automobile which is provided with bearings for stub axles for connection with wheels of an automobile. Fig. 2 illustrates a top view of an end part of the axle at the completion of one of the steps in its formation. Fig. 3 illustrates a top view of an end part in a succeeding step of its formation. Fig. 4 illustrates a section of the bearing part of the finished axle made from the end part shown in Fig. 3. Fig. 5 illustrates a top view of a modified structure of the axle which may be formed from the end part of an axle shown in Fig. 2. Fig. 6 illustrates a section of an end part of the finished axle made from the form of construction shown in Fig. 5. Fig. 7 illustrates a section of modified form of a completed axle made from the form of construction shown in Fig. 5. Fig. 8 illustrates a section of a completed axle made from the form of construction shown in Fig. 7.

Thus variations in the structures may be made according to the uses to which the invention may be put to render the mechanical element most efficient in its operation in the particular structure or mechanisms in connection with which the mechanical element may form a part. While the invention has other features and advantages, it particularly resides in the method of formation, particularly as to the hardness and elasticity and the tensile and shearing strengths of the parts of the mechanical element.

The parts are formed of steel having two different carbon contents, one being used for the bearing part and the other for the body of the mechanical element. The bearing part must necessarily be machined to provide for relative movement between the mechanical element and some other part of the mechanism to which the element is to be connected, while the body of the mechanical element must be so formed as to stand all shock and bending and shearing and the torque stresses to which the mechanical element is subjected, depending upon the use to which it is put. Preferably, a high carbon steel, such as S. A. E. 1045, having an analysis of carbon .40 to .50, manganese .50 to .80, phosphorous .045, maximum, sulphur .05, maximum, is used, for the body of the axle or other mechanical element. The bearing part of the axle is formed from commercial bar stock, either tubular or solid, which has a low carbon content but which does not have a combination of elasticity and hardness of the steel of the body of the axle subsequent to tempering of the body of the axle. In the formation of the mechanical element, the bearing is surrounded by the steel having a high carbon content with the result that the softer steel is securely connected to, and is supported by, or embedded or enclosed in, the body of the axle. Thus the bearing part is surrounded by the metal of the body of the element which renders the portion of the mechanical element having the bearing part as strong and as elastic as any other part of the mechanical element.

Where the invention is used in connection with axles, the torque resisting and load carrying properties required to sustain the stresses to which axles, such as those of automobiles and trucks, are subjected, is produced. The invention is particularly advantageous when applied to tubular axles wherein the body of the axles may be formed of steel tubes, preferably seamless, having end parts that are shaped to receive and permit movement of stub axles, the tube, in each case, being formed of steel having a high carbon content of the general character described above, and the bearing member formed of tubular or solid soft steel or, preferably, of bar stock steel, and enclosed within shaped end portions of the tube and welded in position therein. When the axle has been semi-hardened by heating to approximately 1500 degrees Fahrenheit and quenched in water and drawn at a temperature of 1000 to 1200 degrees, the metal having the small carbon content may be machined for receiving bearing parts for connecting the axle to stub axles. If a higher carbon steel is used in the bearing part of the axle, a higher elastic limit would be produced but it would be practically impossible to machine the same after it has been heat treated. Furthermore, it is impossible to maintain the shape of the axle and maintain the proper bearing surface if it is hardened after machining because of distortions and scaling of the machined parts in the heat treatment. The bearing openings or holes, or, in the case of axles, the king pin holes, cannot be ground, as is customary with small articles where bearings are hardened, because of the fact that it is necessary to rotate the article while being ground. This cannot be readily done with articles having a considerable length, such as axles, which have a length from 50 to 60 inches from the center of the stub axle bearing to the opposite end. In order to rotate such an article to grind the bearing surface, the work plate would have to have a diameter of 8 to 10 feet and the operation would be prohibitive on account of the cost.

By the use of my invention, a tubular axle having an insert securely enclosed by, and welded to, the metal of the body of the axle is heat treated. The bearing part is supported within the metal of the axle body which has an elastic limit of 140,000 to 160,000 pounds tensile strength after it has been heat treated. Thus the weight of the material used may be correspondingly decreased. Where the ordinary axle, in a particular construction, weighs in the neighborhood of 40 pounds, an axle having parts that will sustain the same stress and wherein my invention is utilized in its formation, weighs from 22 to 25 pounds.

When the parts are welded together, a crystalline condition is produced at the weld, but the axle is heated above the critical point of the steel of the bearing part and the steel of the body part of the axle, with the result that the crystalline condition formed at the point of welding is entirely removed and when the quenching operation is properly performed, no internal strains exist in the finished structure. Furthermore, all strains that would otherwise be produced, if the bushing or bearing is pressed into place in the hardened axle body, is eliminated. To withstand the strain of press fitting the bushing in position, a needlessly thick wall portion at the ends of the tubular axle is required and, by my invention, is avoided. In connection with axles, it is particularly desirable to keep the size of the axle end within small dimensional limitations for clearance of the brake mechanism and particularly to enable the use of short yokes and short stub axles.

Thus in the production of axles, the axle is formed of, preferably, tubular steel, having a high carbon content, such as, that referred to as, S. A. E. 1045. The ends of the tubular member are shaped as by upsetting or enlarging to produce the desired exterior dimensions and the desired thickness of the walls of the end parts of the axle. The end parts of the axle are also preferably formed substantially rectangular in the transverse section in order to form an oblong end portion, the major dimension of which being in a substantially vertical plane when the axle is in position in the car, and the smaller dimension extending substantially horizontal, to produce the most efficient stress sustaining shape as between the king pin of the axle and the end parts of the axle and yet provide for using short yokes for interconnecting the stub axles with the main axle.

The end parts of the axle 1 are, preferably, suitably thickened and bored as indicated in Fig. 2. The side walls of the rectangular end portion 2, of the axle 1, may then be, if desired, cut at the corners, such as at 3, to points substantially in a transverse plane extending through the centers of the openings 4 that are formed in the upper and lower walls of the end part 2 of the axle. The centers of the openings 4 are located at points, remote from the end of the axle, substantially equal to the length of a quarter of the length of the edges of the opening 4.

The ends of the side walls 5 may be bent around the ends of the axle. Preferably they are wrapped around the bearing part of the axle. The upper and lower walls 6 may be cut away, preferably leaving a portion substantially the thickness of the side walls 5, that is, to substantially the outer surfaces of the side walls, such as is shown in Fig. 3. The parts are then welded together, as indicated at 8, between the points of contact between the upper and lower edges of the parts of the side walls 5 and the top and bottom walls 6 of the end part 2 of the axle and between the edges of the side wall and the bearing member, if the bearing is inserted in advance of bending the side walls, and also between the edges of the bearing member and the edges of the openings 4.

The axle is then heat treated by first heating the axle to a temperature, approximately 1500 degrees Fahrenheit, and quenched in water and drawn at a temperature of 1000 to 1200 degree Fahrenheit, which produces an elastic limit in the body of the metal approximately 140,000 pounds per square inch, while the bearing part 7 is still sufficiently soft to be machinable for drilling and finishing the openings for the stub axle bearing pins. The bearing parts will be tightly enclosed in the body of the axle by the uniform contraction of the metal of the axle and the metal of the bearing part. If desired, solid bar stock metal may be used for forming the bearing parts and the openings may be formed therein subsequent to the heat treatment. This insures accurate centers of the openings and, particularly, of the bearing surfaces in the openings in the bushings, or in the bar stock metal, with reference to the body of the axle and with reference to each other. Where a bearing bushing is used it is, after quenching, invariably out of alignment and, furthermore, its bearing surface must be remachined or resurfaced on account of the scaling that occurs in the heat treating. When the bearing 7 has been remachined there will be produced an axle having a bearing part that is surrounded by hardened or semi-hardened steel of the body of the axle, and wherein there are no stresses or strains due to crystalline conditions or due to press fitting the bushing into position, and also wherein a smooth bearing surface, properly centered, is formed.

If desired, the formation of the end part of the axle may be varied by removing a portion of the upper and lower wall of the end part of the axle located between the opening 4 and the end of the axle and leaving only the side walls 5. This, however, will locate side wall end portions that have a width substantially equal to the major dimension of the end part of the axle. A bushing 10, formed of tubular bar stock metal, and having a low carbon content, may then be located between the side walls 11, and the side walls 11 may be bent about the exterior surface of the bushing 10 so as to enclose the bushing. The bushing may be provided with flanges at its ends, such as the flange 12 that forms an additional load carrying support as between the load on the axle which is carried by the stub axles. The metal of the body of the axle about the bushing 10 is welded to the ends of the bushing as indicated as at 13, and also at the points where the ends of the walls 11 come in contact with each other, or are located in proximity to each other, as at 14.

The axle is then heat treated to produce the desired hardness in the body of the axle, and the bushing may then be bored to remove the scale and to recenter the bearing surface of the bushing.

If desired, solid bar stock metal 16 may be secured in position in the formed end parts of the axle. The bar stock piece may then be welded by heating the ends of the piece to the upper and lower walls of the end part of the axle and to the end edges which may also be welded together, as indicated at 17. After the axle has been heat treated, the pieces of bar stock, secured within the axle, may be bored at the desired points to form the bearing surfaces 18, as indicated in Fig. 8.

Thus by my invention I have provided an axle which is exceedingly efficient and wherein all stresses and strains, due to heat treatment and interconnecting the body of the axle with the bearing, is entirely avoided and yet wherein the bearing treated will be sustained by surrounding hardened steel.

I claim:

1. The process of forming an axle from steel tubing which consists in forming substantially rectangular end parts on the ends of the steel tubing, forming openings in opposite side walls of the end parts of the tubing, slitting the end parts along their corners, inserting bearing members in the said openings and bending the ends of the side walls other than those in which the openings are formed about the bearing members to substantially cover the ends of the axle, the body portion of the said axle formed of steel having a high carbon content, the bearing members formed of a steel having a low carbon content, heat treating the axle to harden the steel of the body of the axle while maintaining the bearing part machinable and then forming a bearing surface within the bearing part.

2. The process of forming an axle from steel tubing which consists in forming end parts of the steel tubing substantially rectangular in form in the cross section thereof, slitting the end parts of the tube at the corners of the end parts and bending the ends of the side walls towards each other to locate the ends of the side walls in close proximity to each other and closing the ends of the axle.

3. The process of forming an axle from steel tubing, which consists in forming substantially rectangular end parts on the ends of the steel tubing, forming openings in opposite side walls of the end parts, slitting the end parts along their corners, inserting bearing members in the said openings and bending the ends of the side walls other than those in which the openings are formed about the bearing members to substantially cover the ends of the axle.

4. The process of forming an axle from steel tubing, which consists in forming substantially hollow rectangular end parts on the ends of the steel tubing, forming openings in opposite side walls of the end parts, slitting the end parts along their corners, inserting bearing members in the said openings and bending the ends of the side walls other than those in which the openings are formed about the bearing members to substantially cover the ends of the axle and welding the contacting surfaces of the parts together.

5. The process of forming an axle which consists in forming the body of the axle into the desired shape from steel light wall tubing having a high carbon content and welding steel bearing members having a low carbon content within the ends of the tube and heating and chilling the axle and the bearing members welded therein to produce uniform contraction of the two metals while maintaining the low carbon metal softer than the other metal and machinable and then machine forming bearing surfaces within the bearing members.

6. The process of forming an axle which consists in forming the body of the axle into the desired shape from steel light wall tubing having a high carbon content and welding solid bar stock steel members having a low carbon content within the ends of the tube and heating and chilling the axle and the members welded therein to produce uniform contraction of the two metals while maintaining the low carbon metal softer than the other metal and machinable and then boring the said members to form bearing surfaces within the said members.

7. The process of forming an axle from steel tubing which consists in forming substantially hollow rectangular end parts on the ends of the steel tubing, removing two opposite side walls of the said end parts and forming semi-circular edge portions in the side walls interconnecting the remaining side parts, inserting bearing members fitting the said edges between the remaining side parts and locating them against the said edges and wrapping the remaining side parts about the said bearing members to enclose the bearing members, and welding the ends of the remaining side parts to each other and to the bearing member.

8. The process of forming an axle from steel tubing having a high carbon content which consists in forming substantially hollow rectangular end parts on the ends of the steel tubing, removing two opposite side walls of the said end parts and forming semi-circular edge portions in the side walls interconnecting the remaining side parts, inserting bearing members fitting the side edges between the remaining side parts and locating them against the side edges, the said bearing members formed of low carbon steel and wrapping the remaining side parts about the said bearing members to enclose the bearing members and welding the ends of the remaining side parts to each other and to the bearing members and heating and chilling the axle and the bearing members welded therein to produce uniform contraction of the two metals while maintaining the low carbon metal softer than the other metal and machinable and then machine forming the bearing surfaces within the bearing members.

9. The process of forming an axle from thin steel tubing having a relatively high carbon content which consists in forming thickened end portions in the said steel tubing, removing portions oppositely disposed in the said thickened end parts, inserting and welding bearing members between the remaining portions of the said thickened end parts, the said bearing members formed of steel having a lower carbon content, heating and chilling the axle and the bearing members welded therein, producing uniform contraction of the said metals while maintaining the low carbon metals softer than the other metal and machinable and then machine forming bearing surfaces within the bearing members.

In witness whereof I have hereunto signed my name to this specification.

BERTIS H. URSCHEL.